Jan. 4, 1955
H. T. SLIGER
2,698,755
GEAR CHUCK
Filed Nov. 26, 1952
2 Sheets-Sheet 1
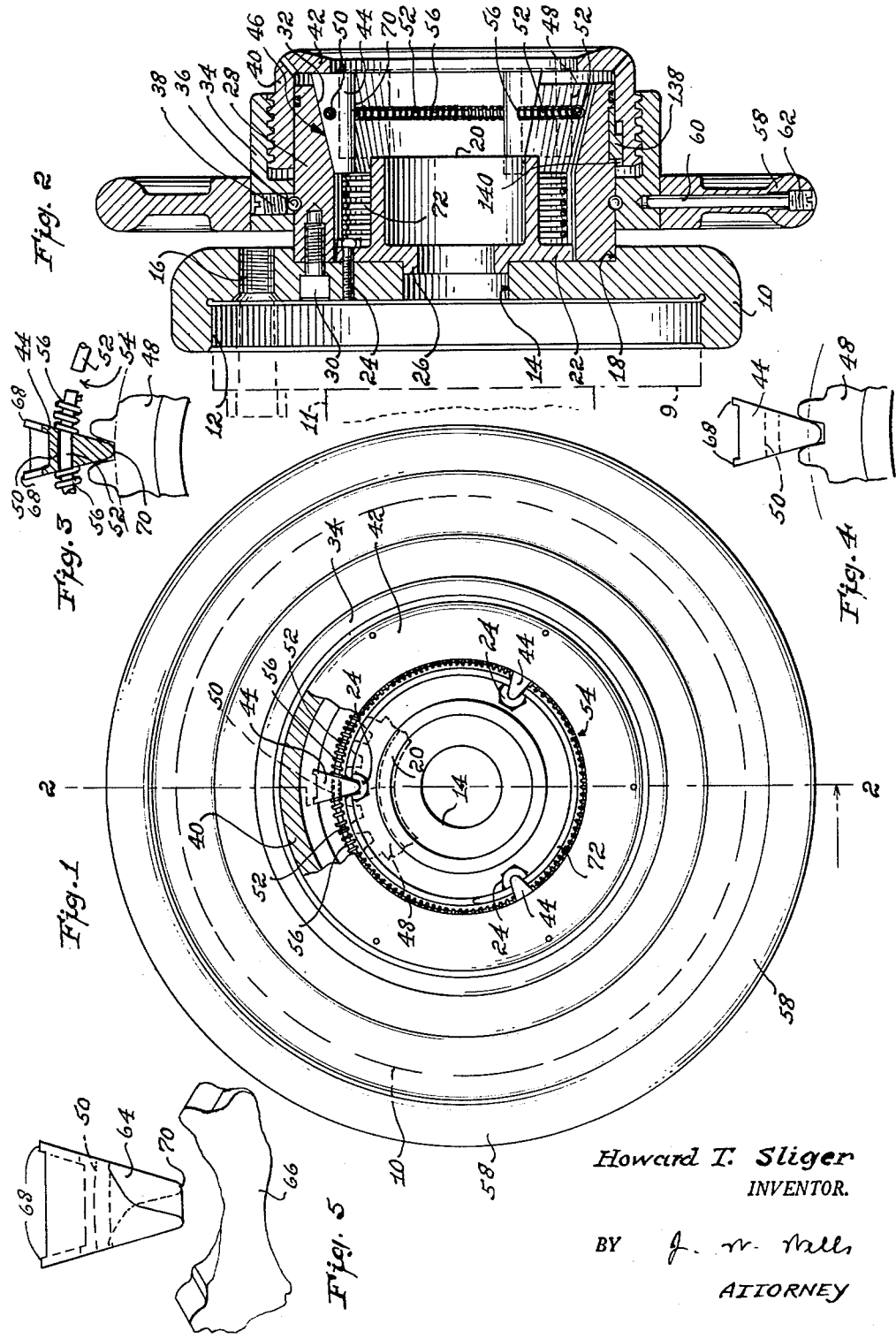
Howard T. Sliger
INVENTOR.
BY J. W. Mills
ATTORNEY

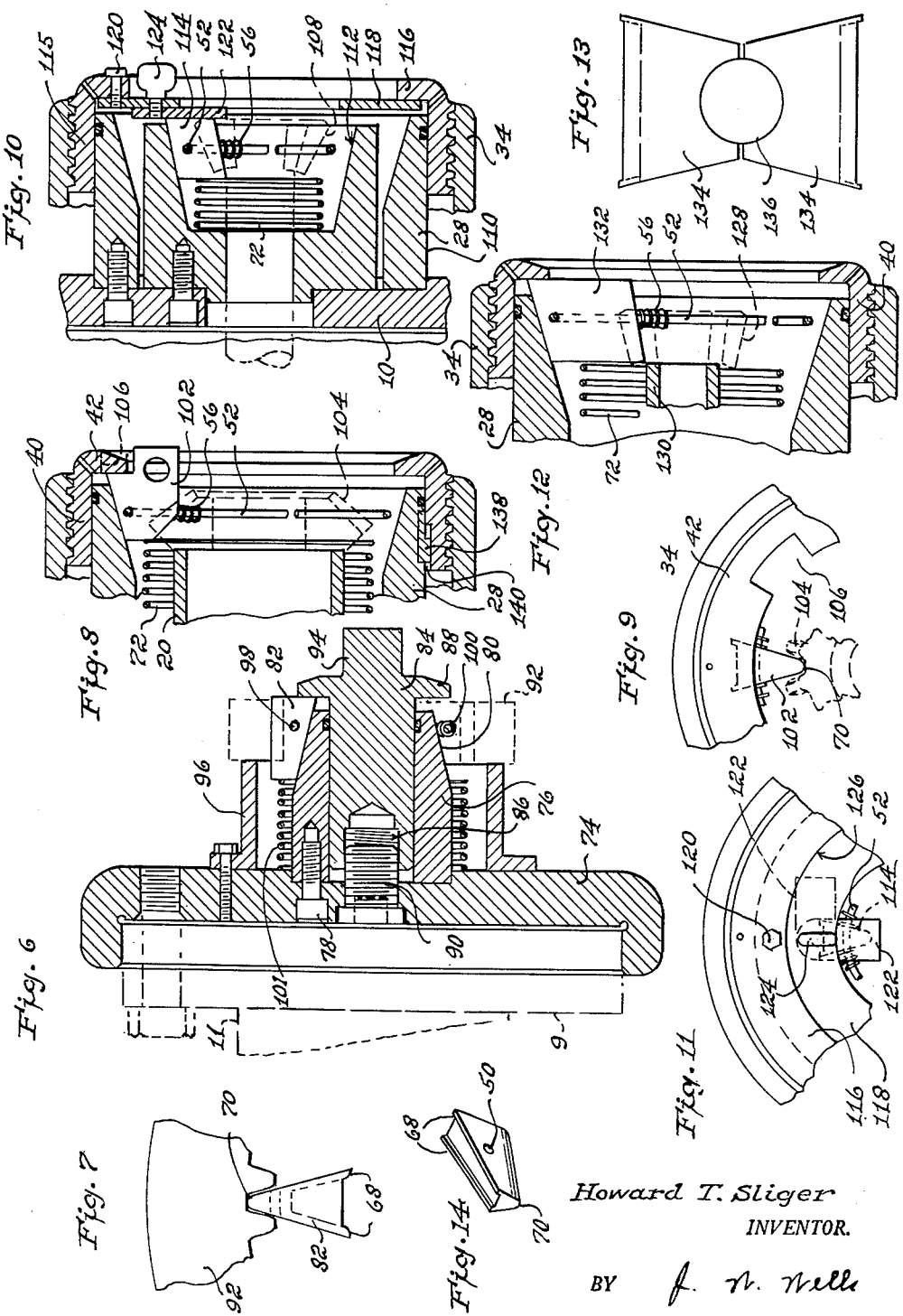

United States Patent Office 2,698,755
Patented Jan. 4, 1955

2,698,755

GEAR CHUCK

Howard T. Sliger, Chattanooga, Tenn.

Application November 26, 1952, Serial No. 322,637

11 Claims. (Cl. 279—59)

This invention relates to gear chucks, and one of the principal objects of the invention is to provide a chuck of simple, efficient and economical construction which will greatly facilitate the chucking of gears of various types for boring or grinding, as well as the chucking of other irregular shaped parts or objects of different kinds.

Another object of this invention is to provide a gear chuck which will be adaptable to various forms of gears and other parts or objects with only minor variations in the structure of the parts comprising the chuck.

A further object of the invention is to provide a chuck assembly in which jaws for various parts or objects can be maintained in assembled sets with each of the jaws held in spaced relation but shiftable for engagement between gear teeth or in irregular depressions.

A still further object of my invention is to provide a gear chuck construction which with only slight variations is equally well adapted for chucking either externally or internally toothed gears.

Other objects and advantages of my invention will be apparent from the following specification and reference to the accompanying drawings showing certain embodiments of my invention, in which Fig. 1 is a front view of one embodiment of my invention, partly in section;

Fig. 2 is a section taken on the line 2—2;

Fig. 3 is a detail sectional view of one form of chuck jaw in accordance with my invention;

Fig. 4 is an end view of a modified form of chuck jaw;

Fig. 5 is an end view of another form of chuck jaw;

Fig. 6 is a sectional view of a chuck jaw adapted for chucking an internally toothed gear;

Fig. 7 is an end view of a jaw engaging an internally toothed gear;

Fig. 8 is a detail sectional view similar to Fig. 2, but with jaws adapted for chucking a certain form of bevel gear;

Fig. 9 is a fragmentary end view showing the parts illustrated in Fig. 8;

Fig. 10 is a sectional view similar to Fig. 8 but with chuck body and jaws adapted to a small pinion integral with a shaft;

Fig. 11 is an end view showing the parts illustrated in Fig. 10;

Fig. 12 is a sectional view similar to Fig. 8 and showing jaws and spacer adapted to a small bevel gear;

Fig. 13 is an end view showing jaws adapted to grip a round object; and

Fig. 14 is a perspective view of one form of chuck jaw.

Referring to the drawings in which like numerals designate like parts in the several views, the chuck shown in Figs. 1 and 2 is arranged for chucking externally threaded gears, or other objects requiring exterior gripping contact and includes a mounting plate 10 which has a recess 12 in its rear face, an axial bore 14, a plurality of spaced, threaded openings 16 and a recess 18 in its front face. A cylindrical spacing member 20, having a rear flange 22 is attached to the mounting plate 10 by screws 24 projecting through the flange 22. A cylindrical boss 26 projects rearwardly from the flange 22 into the bore 14. A hollow cylindrical chuck body 28 is seated in the recess 18 and attached to plate 10 by screws 30. The chuck body is provided with an axially conical internal surface 32 inclined forwardly. A sleeve 34 is rotatably mounted on the outer perimeter of the chuck body, but held against axial movement thereon by ball bearings 36 secured against displacement from their races by the screw 38.

A collar 40 is threadedly connected with the sleeve 34 and has a radial, inwardly projecting flange 42. A plurality of chuck jaws 44 are inserted in the conical portion 32 of the chuck body and project a short distance forwardly of the front end of the chuck body. The flange 42 bears against the front ends of the jaws 44. One edge 46 of each of the jaws 44 is tapered to correspond with and is in contact with the conical surface 32 of the chuck body. The opposite edge 46 of each jaw is formed to fit between the teeth of a spur gear 48 (shown dotted). Each jaw 44 is provided with a lateral opening 50 through which a resilient ring 52 slidably projects. This ring is split, as indicated at 54 to permit radial yielding of the ring. A helical spring 56 is mounted on the ring 52 between each opposed pair of jaws 44 to maintain them normally in spaced relation. The resilient split ring 52 maintains the jaws in annular relation. A hand wheel or handle member 58 is removably mounted on the sleeve 34 and secured thereto by means of a pin 60 having threaded connection at 62 with the rim of the wheel 58.

When the hand wheel is rotated clock-wise it will draw the flange 42 against the front ends of the jaws 44 and force the jaws rearwardly into the conical portion 32 of the chuck body. This, in turn, forces the jaws radially and inwardly into gripping contact with the gear 48. As illustrated in Fig. 3, the jaws 44 are so formed as to engage the root perimeter of the gear 48. As illustrated in Fig. 4, the jaws 44 are so formed as to engage each of a pair of teeth of the gear 48 at the pitch circle. Also, as previously mentioned, the contact edges of the jaws may be arranged to grip the circumferential surface of a part or object of any shape. In Fig. 5 is shown a jaw 64 formed to engage a helical gear 66. The tapered edge of each jaw 44 is preferably grooved to form longitudinal ridges 68, as clearly shown in Figs. 3, 4, 5 and other views. The engagement of these ridges with the conical surface of the chuck body insures a solid contact. The edge of each jaw for contact with a toothed gear is preferably rounded as indicated at 70 to facilitate entrance between the teeth. A helical spring 72 is interposed between the flange 22, of the spacing member 20 and the rear ends of the jaws 44 to maintain the jaws normally in open or forward position against the flange 42 of the collar 40.

In the operation of the chuck illustrated in Figs. 1 and 2, a spur gear 48 is placed against the front end of the spacing member 20, as shown in dotted lines, with the contact edge of each jaw between the gear teeth. The hand wheel 58 is then rotated clockwise, thereby moving the collar 40 rearwardly. The flange 42, in engagement with the front ends of the jaws 44, forces the jaws rearwardly in the conical portion of the chuck body. This also forces the jaws radially and inwardly into gripping contact with the gear, irrespective of whether the jaws contact the root perimeter of the gear or the surfaces of the teeth at the pitch circle.

The jaws 44 are preferably made in sets of three or more, maintained in circumferential and spaced relation by the split ring 52 and the helical spring 56 mounted thereon. Each set of jaws may be used for gears of several varying diameters. Then, for larger or smaller gears, sets of wider or narrower jaws may be used. The ranges of gear sizes may be stamped on the jaws for convenience of selection. The split ring yields radially as the jaws are forced into gripping contact with a gear, or other object to be chucked. Various sizes of chuck bodies 28 with sleeves 40 of correspondingly varying sizes may be attached to the mounting plate 10, which plate may be attached to the face plate 9 of a lathe or grinder (shown dotted) by means of bolts projecting into the threaded holes 16 or the mounting plate can be attached to a spindle 11 of a lathe, grinder or similar machine. In either arrangement the mounting plate is connected with the spindle.

In Fig. 6 is shown a chuck of a construction generally similar to that shown in Figs. 1 and 2, except that it is adapted for chucking gears having internal teeth, or other objects to be gripped within an opening in the object. Accordingly, the conical surface of the chuck body is external and the clamping member is rotatably mounted inside, instead of outside the chuck body. The mounting plate 74 is generally similar to the plate 10, and is connected with a spindle in the same manner. The chuck body 76 is attached at one end to the mounting plate with bolts 78 and is provided at its other end with an external conical surface 80. Each jaw 82 has its inner edge tapered to correspond with the conical surface of the chuck body. The clamping member 84 may have a threaded socket 86 at its rear end and provided with a flange 88 at its front end for engagement with the front ends of the jaws 82. A stud 90 may be attached to the mounting plate, as illustrated for cooperation with the threaded socket 86, in forcing the jaws 82 rearwardly to chuck the internal gear 92 (shown dotted in Fig. 6). Also a wrench hold 94 may be formed on the outer end of the member 84, to accommodate the use of a wrench. However, hydraulic power may be applied to force the flange 88 against the ends of the jaws, without the use of threaded means for forcing the jaws into gripping contact with a gear. A spacing member 96, corresponding to the member 20, provides a locating stop and support for the gear 92. The jaws are held in annular relation by a split ring 98, and spaced by helical springs 100 slidably mounted on the ring. A helical spring 101 urges the jaws 82 forwardly in the same manner as the spring 72.

In Figs. 8 and 9 is shown a form of gear chuck similar in construction to the chuck illustrated in Figs. 1 and 2, except that the jaws 102 are arranged for gripping a bevel gear 104 (shown dotted). Also in this form the flange 42 of the collar 40 is provided with slots 106 through which the jaws may be inserted into and withdrawn from the conical portion 32 of the chuck body 28, as shown more clearly in Fig. 9.

The form of chuck shown in Fig. 10 is particularly adapted for chucking small pinions 108 made integral with a shaft (shown dotted). In this embodiment of my invention, a cup-shaped chuck body 110 is installed inside the regular chuck body 28. The chuck body 110 is provided with an internal tapered socket 112 within which the jaws 114 are slidably mounted. The collar 114 on the sleeve 34 has a radial flange 116 back of which is a removable flange member 118 held by screws 120. Abutment members 122 are hingedly attached to the flange member 118 by means of thumb screws 124. The members 122 are normally in front of the jaws 114, but may be swung out of the path of the jaws when the screws 124 are loosened. The jaws can then be removed from or inserted into the tapered chuck body through the opening 126 in the flange member 118.

The form of the invention shown in Fig. 12 is generally similar to the form shown in Figs. 1 and 2 except that it is adapted for chucking a small bevel gear 128 (shown dotted). This requires that the spacing member 130 be of smaller diameter and that the jaws 132 be made relatively wider than in the form shown in Figs. 1 and 2. It will also be seen that both edges of each of the jaws 132 are tapered.

In Fig. 13 is shown a pair of jaws 134, adaptable to my improved chuck, for gripping a rod 136, or bushing.

In the forms of chucks shown in Figs. 1, 2, 8, 10 and 12 a key 138 carried by the chuck body is slidably mounted in a groove 140 in the collar 40—114, to prevent relative rotation, while permitting relative sliding movement between the chuck body and collar.

From the foregoing description it will be seen that by attaching the proper adapter parts to the mounting plate and using sets of chuck jaws having the proper gripping edges, my improved chuck can be used for chucking a great variety of round or irregular shapes, such as eccentrics, hubs, cams, bushings, cam gears, and all types of gears, including pinions which are an integral part of a shaft. Gears can be chucked before or after the teeth are cut; and bevel gears and pinions can be chucked with the teeth toward either the front or rear, thus permitting the grinding of tapered holes in either direction. This also provides for finished grinding of both faces of the gear at one chucking.

My improved chuck will average out or compensate for errors in cutting or heat treating of gears. This chuck has a very wide range of operation. For example, the chuck as illustrated has a range of 1 inch to 5 inches by changing the jaws. Also this chuck will accommodate any pitch or any form of gear teeth without changing jaws, provided that it is the same type of gear.

Various modifications in the details of my improved chuck may be made within the spirit and scope of my invention. Therefore, it should be understood that the embodiments of my invention shown and described are intended to be illustrative, only, and not limited to such specific construction.

I claim:

1. A chuck comprising, in combination, a substantially flat mounting plate having means for attaching said plate to a machine spindle, a hollow cylindrical chuck body provided at one end with means for attaching it to said plate and at its other end with an axially conical surface, a plurality of spaced and axially aligned jaws arranged in circumferential relation with said conical surface, each of said jaws having one edge longitudinally tapered to correspond with and in contact with said conical surface and its opposite edge arranged for circumferential contact with an object to be chucked, radially yieldable means carried by said jaws for maintaining them in annular relation, a cylindrical spacing member provided at one end with means for attaching it to said mounting plate and arranged at its other end for contact with said object, and rotatable means supported by said chuck body and engaging said jaws for forcing them rearwardly and radially into gripping contact with said object.

2. A chuck comprising, in combination, a substantially flat mounting plate having means for attaching said plate to a machine spindle, a hollow cylindrical chuck body provided at one end with means for attaching it to said plate and at its other end with an axially conical surface, a plurality of spaced and axially aligned jaws arranged in circumferential relation with said conical surface, each of said jaws having one edge longitudinally tapered to correspond with and in contact with said conical surface and its opposite edge arranged for circumferential contact with an object to be chucked, radially yieldable means carried by said jaws for maintaining them in annular relation, a cylindrical spacing member provided at one end with a flange for attaching it to said mounting plate and arranged at its other end for contact with said object, a helical spring between said plate and the rear ends of said jaws urging said jaws forwardly, and means rotatably supported by said chuck body and engaging said jaws for forcing them rearwardly and radially into gripping contact with said object.

3. A chuck comprising, in combination, a substantially flat mounting plate having means for attaching said plate to a machine spindle, a hollow cylindrical chuck body provided at one end with means for attaching it to said plate and at its other end with an axially conical surface, a plurality of spaced and axially aligned jaws arranged in circumferential relation with said conical surface, each of said jaws having one edge longitudinally tapered to correspond with and in contact with said conical surface, and its opposite edge arranged for circumferential contact with an object to be chucked, a lateral opening in each of said jaws, a resilient split ring extending slidably through the opening in each jaw for maintaining said jaws in annular relation, and rotatable means supported by said chuck body and engaging said jaws for forcing them rearwardly and radially into gripping contact with said object.

4. A chuck according to claim 3 and including a helical spring slidably mounted on said split ring between each opposed pair of said jaws to hold said jaws in spaced relation and permit shifting of said jaws axially of said ring.

5. In a chuck of the character described, a plurality of jaws each of said jaws having one edge longitudinally tapered and its opposite edge arranged for circumferential contact with an object to be chucked, a lateral opening in each of said jaws, and a resilient split ring extending slidably through the opening in each jaw for maintaining said jaws in annular relation.

6. In a chuck of the character described, a plurality of jaws, each of said jaws having one edge longitudinally tapered and its opposite edge arranged for circumferential contact with an object to be chucked, a lateral opening in each of said jaws, a resilient split ring extending slidably through the opening in each jaw for maintaining said jaws in annular relation, and a helical spring slidably mounted on said ring between each opposed pair of said jaws to hold said jaws in spaced relation and permit shifting of said jaws axially of said ring.

7. A chuck comprising, in combination, a substantially flat mounting plate having means for attaching said plate to a machine spindle, a hollow cylindrical chuck body provided at one end with means for attaching it to said plate and at its other end with an internal axially conical surface, a plurality of spaced and axially aligned jaws arranged in circumferential relation with said conical surface, each of said jaws having one edge longitudinally tapered to correspond with and in contact with said conical surface and its opposite edge arranged for circumferential contact with an object to be chucked, radially yieldable means carried by said jaws for maintaining them in annular relation, a threaded sleeve carried by said chuck body, a collar threadedly connected with said sleeve, said collar having an inwardly projecting flange on its front end for engagement with the front ends of said jaws for forcing said jaws rearwardly and radially into gripping contact with said object, slidable means between said threaded sleeve and said threaded collar for preventing relative rotation of said sleeve and collar; and a radially projecting handle member detachably connected to said chuck body.

8. A chuck comprising, in combination, a substantially flat mounting plate having means for attaching said plate to a machine spindle, a hollow cylindrical chuck body provided at one end with means for attaching it to said plate and at its other end with an internal axially conical surface, a plurality of spaced and axially aligned jaws arranged in circumferential relation with said conical surface, each of said jaws having one edge longitudinally tapered to correspond with and in contact with said conical surface and its opposite edge arranged for circumferential contact with an object to be chucked, radially yieldable means carried by said jaws for maintaining them in annular relation, a threaded sleeve carried by said chuck body, a collar threadedly connected with said sleeve, said collar having an inwardly projecting flange on its front end for engagement with the front ends of said jaws for forcing said jaws rearwardly and radially into gripping contact with said object, said flange having a plurality of slots in its inner edge to permit insertion and removal therethrough of said jaws, said slots being equal in number and in spaced relation with said jaws; and a radially projecting handle member detachably connected to said chuck body.

9. A chuck comprising, in combination, a substantially flat mounting plate having means for attaching said plate to a machine spindle, a hollow cylindrical chuck body provided at one end with means for attaching it to said plate and at its other end with an exterior, axially conical surface, a plurality of spaced and axially aligned jaws arranged in circumferential relation with said conical surface, each of said jaws having one edge longitudinally tapered to correspond with and in contact with said conical surface and its opposite edge arranged for circumferential contact with an object to be chucked, a helical spring between said mounting plate and the rear ends of said jaws urging said jaws forwardly, radially yieldable means carried by said jaws for maintaining them in annular relation, a cylindrical clamping member rotatably mounted in said chuck body axially thereof, said member having threaded means at its end adjacent to said mounting plate for effecting axial movement of said member, and said member having a radial flange at its other end engaging the front ends of said jaws for forcing them rearwardly and radially into gripping contact with said object.

10. A chuck comprising, in combination, a substantially flat mounting plate having means for attaching it to a machine spindle, a cylindrical, cup-shaped chuck body provided at its closed end with means for attaching it to said plate, at its other end with an internal conical surface and with an axial bore through its closed end to permit insertion therethrough of a shaft having an integral pinion, a plurality of spaced and axially aligned jaws arranged in circumferential relation with said conical surface, each of said jaws having one edge longitudinally tapered to correspond with and in contact with said conical surface and its opposite edge arranged for circumferential contact with a pinion to be chucked, a helical spring between the closed end of said chuck body and the rear ends of said jaws urging said jaws forwardly, radially yieldable means carried by said jaws for maintaining them in annular relation, and rotatable means supported by said mounting plate and engaging said jaws for forcing them rearwardly and radially into gripping contact with said pinion.

11. A chuck comprising, in combination, a substantially flat mounting plate having means for attaching it to a machine spindle, a cylindrical, cup-shaped chuck body provided at its closed end with means for attaching it to said plate, at its other end with an internal conical surface and with an axial bore through its closed end to permit insertion therethrough of a shaft having an integral pinion, a plurality of spaced and axially aligned jaws arranged in circumferential relation with said conical surface, each of said jaws having one edge longitudinally tapered to correspond with and in contact with said conical surface and its opposite edge arranged for circumferential contact with a pinion to be chucked, radially yieldable means carried by said jaws for maintaining them in annular relation, and rotatable means supported by said mounting plate and engaging said jaws for forcing them rearwardly and radially into gripping contact with said pinion, said rotatable means including a collar having an inwardly projecting flange, and a plurality of abutment members for contact with the front ends of said jaws, said members being hingedly mounted on said flange, said members being movable from the path of said jaws to permit their insertion into and removal from said chuck body.

References Cited in the file of this patent

UNITED STATES PATENTS

| | | |
|---|---|---|
| 814,648 | Hanson | Mar. 6, 1906 |
| 2,508,731 | Stoner | May 23, 1950 |

FOREIGN PATENTS

| | | |
|---|---|---|
| 225,409 | Switzerland | 1943 |